J. C. STANGIER, DEC'D.
B. STANGIER, ADMINISTRATRIX.
ELECTROMAGNETIC MEASURING APPARATUS.
APPLICATION FILED MAR. 16, 1918.
1,422,317.
Patented July 11, 1922.
2 SHEETS—SHEET 1.
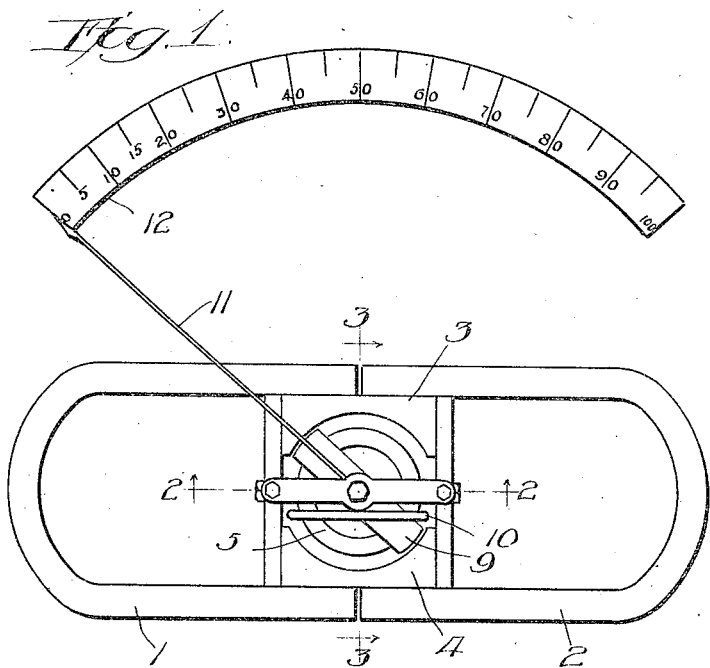
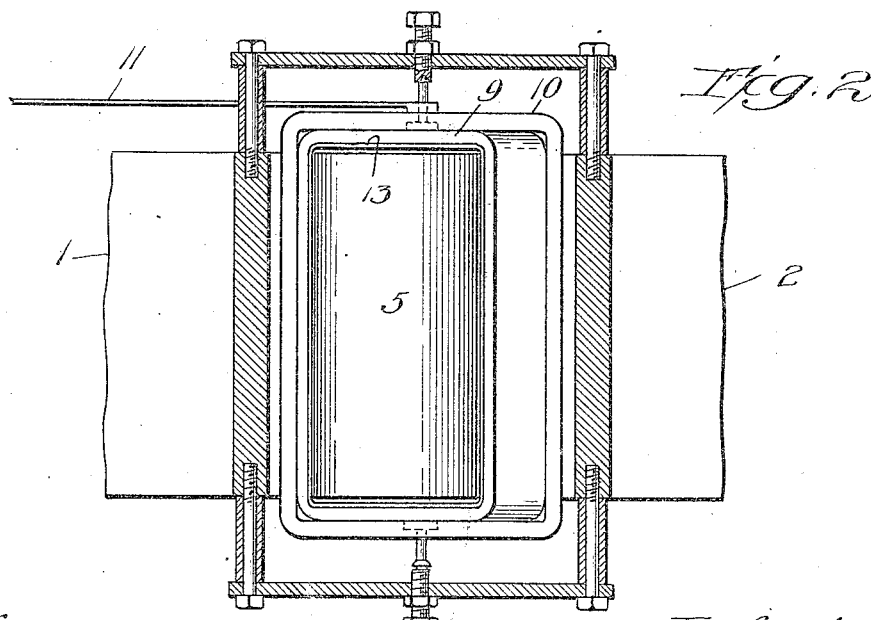

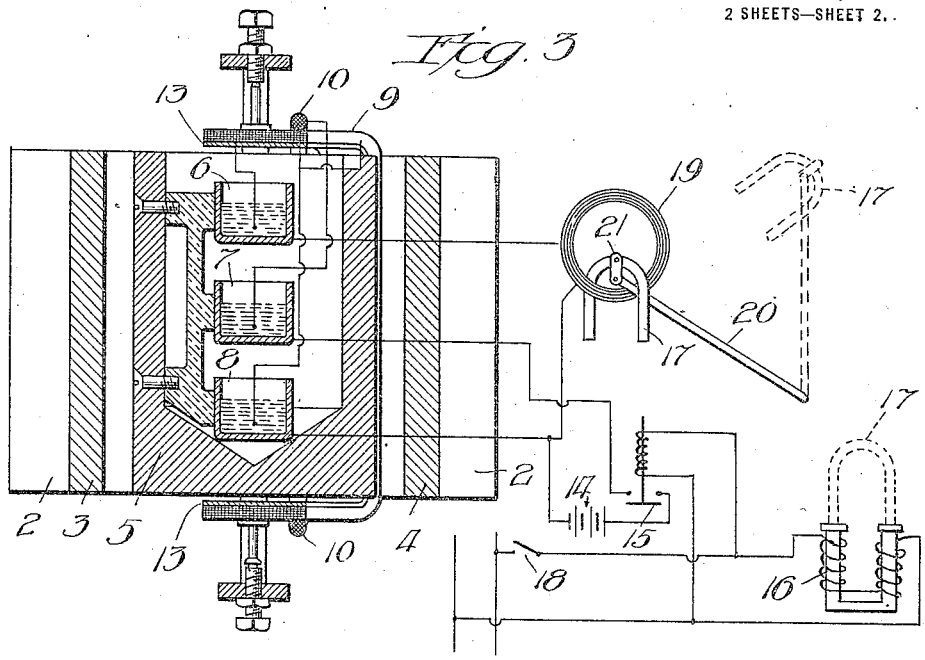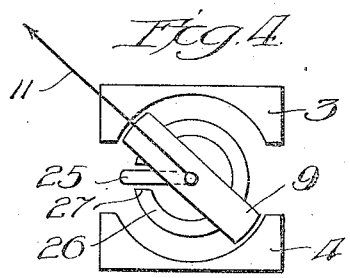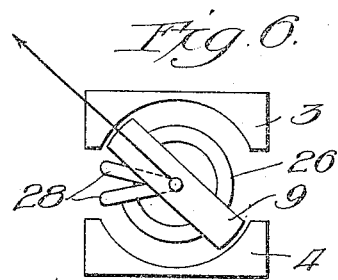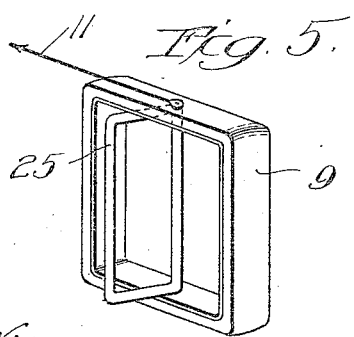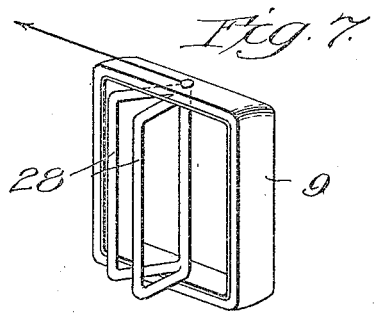

UNITED STATES PATENT OFFICE.

JOSEPH C. STANGIER, OF CHICAGO, ILLINOIS; BERTHA STANGIER ADMINISTRATRIX OF SAID JOSEPH C. STANGIER, DECEASED.

ELECTROMAGNETIC MEASURING APPARATUS.

1,422,317. Specification of Letters Patent. Patented July 11, 1922.

Application filed March 16, 1918. Serial No. 222,931.

*To all whom it may concern:*

Be it known that I, JOSEPH C. STANGIER, a citizen of the United States, residing at Chicago, county of Cook, State of Illinois, have invented a certain new and useful Improvement in Electromagnetic Measuring Apparatus, and declare the following to be a full, clear, and exact description of the same, such as will enable others skilled in the art to which it pertains to make and use the same, reference being had to the accompanying drawings, which form a part of this specification.

My invention relates to improvements in that type of measuring instrument in which the deflection of the moving element is a measure of the quantity of electricity allowed to flow or be discharged through the instrument and it has for its objects: first, to produce a simple and rugged apparatus which will permit measurements to be made rapidly and accurately without requiring that time or attention be given to bringing the pointer or indicator to the zero position; and second, to produce an instrument in which the controlling force is active only while the moving element is in motion, the controlling force preferably being high so that the friction of the pivots and other mechanical resistance to the movement of the movable element will be so small in comparison with the controlling force as not to affect the accuracy of the instrument.

By having the controlling force active only while the moving element of the instrument is in motion, the pointer or indicator, when moved from zero during the making of a test, will travel to a definite point on the scale, will stop at that point, and will remain at the stopping point at the will of the user instead of creeping back toward the zero point as would be the case if the controlling force were active continuously.

In all instruments of the general type to which the present invention relates, of which I am aware, the movable element is actuated by a current in opposition to a counterforce in the form of a spring or weight, the torsional resistance of a suspending member, a magnetic device, or other means which is at all times active. In accordance with my invention, the controlling force coming into action only when the movable element is in motion and again becoming inactive when said element comes to rest, the deflection of the moving element is determined by the controlling force which thereafter has no effect on the pointer or indicator instead of causing the latter to move out of its position of rest as is the case in the old forms of instruments.

In any instrument there will be more or less resistance to movement on account of friction in the bearings, or the torsion in suspensions, or electrical connections to moving coils; and this, in the ordinary instrument, of course affects the readings of the instrument. As this resistance varies at different times and under different conditions, the instrument will not at all times possess the same degree of accuracy. Furthermore, where the time element must be taken into consideration as, for example, where an exploring coil is moved across a magnetic field which is to be measured, the resistance of the bearings or supports and connections, even though it should remain constant, will make the ordinary instrument give a different reading when the exploring coil is moved quickly than when it is moved slowly. Therefore, by providing a controlling force which is very much greater than the resistance to which I have just referred, I am enabled to nullify the effect of such resistance to movement of the movable element of the instrument so that for all practical purposes, the operation of the instrument will not be affected by the factors just specified.

In an instrument of the general type under discussion, the time required to secure an accurate reading would be greatly reduced if it were not necessary to adjust the pointer or indicator accurately to the zero position whenever a test is to be made and a reading taken, because of the many factors which tend to prevent the moving element from returning exactly to its zero position in the ordinary instrument. In accordance with my invention I provide means which enable the user always to be certain that the pointer or indicator starts from zero whenever a test is to be made and a reading taken, without in any way affecting or influencing the action of the instrument while a measurement is being made, and without taking up the time or attention of the user.

The various features of novelty whereby my invention is characterized will hereinafter be pointed out with particularity in the claims; but, for a full understanding of my invention and of its objects and advantages, reference may be had to the following detailed description taken in connection with the accompanying drawings, wherein:

Figure 1 is a top plan view of an instrument arranged in accordance with a preferred form of my invention;

Fig. 2 is a section taken approximately on line 2—2 of Fig. 1, on an enlarged scale, the central core and the movable element being shown in elevation;

Fig. 3 is a section taken approximately on line 3—3 of Fig. 1, on the same scale as Fig. 2, including a diagram illustrating my invention as embodied in a complete apparatus or system for magnetizing and testing permanent magnets;

Fig. 4 is a top plan view of the pole pieces and the movable element of a slightly modified form of instrument;

Fig. 5 is a perspective view of the movable element shown in Fig. 4;

Fig. 6 is a view similar to Fig. 4 showing a further modification; and

Fig. 7 is a perspective view of the movable element shown in Fig. 6.

Reference being had to Figs. 1 to 3 of the drawings, 1 and 2 are permanent magnets with which are associated pole pieces, 3 and 4, facing toward each other and shaped at their ends to provide a cylindrical space between them. Within the space between the pole pieces is a cylindrical core, 5, somewhat smaller in diameter than said cylindrical space. In the arrangement shown, the core is in the form of a cup in which are placed a series of mercury cups, 6, 7 and 8, through which the electrical connection to the moving element is made, so that a very compact instrument is obtained.

The movable element of the instrument comprises a main coil, 9, and an auxiliary coil, 10, rigidly connected together; the main coil extending diametrically across the space between the pole pieces and being supported for rotation about the axis of said cylindrical space. Where the main coil is in the form of a rectangle, two of the sides lie in the gaps between the central core and the two pole pieces, and the other two sides extend across the top of and beneath the core. The auxiliary coil, which may be called the zero coil, may also be in the form of a rectangle having two of its sides lying in the gap between the central core and the pole pieces and having its other two sides extending across the ends of the central core; the plane of the zero coil being parallel to the axis of rotation but making an angle with the plane of the main coil. A pointer, 11, adapted to swing over a graduated scale, 12, is fixed to the movable element of the instrument; the parts being so disposed that when the pointer is at zero the auxiliary coil lies in a weak portion of the magnetic field while the main coil remains in the substantially uniform field through which it is adapted to swing.

If the movable element of the instrument be shifted so as to carry the pointer out of the zero position and a current is allowed to flow through the auxiliary coil, the effect will be to drive this coil out of the stronger magnetic field into which it will have been placed and into the weaker field in which it lies when the pointer is at zero as shown in Fig. 1. When no current is flowing through the auxiliary coil, the latter has no effect on the working of the instrument other than as so much dead weight. Therefore, by providing means for supplying the auxiliary or zero coil with current when and as desired, the user can always be certain that the pointer starts from zero when a test is to be made and the actuating current is allowed to flow through the main coil.

In order to limit the swinging movement of the movable element to a point which shall depend upon the value of current that is caused to flow through the main coil, 9, without making use of a spring or other extraneous and constantly-active counterforce, I provide means for producing a strong counter-torque in the rotatable member of the instrument itself. This may be accomplished by winding the main coil upon a metallic ring or bobbin, 13, of low resistance, so that when the movable element of the meter begins to turn a strong counter-torque or damping effect will be produced by reason of the counter-electromotive force in the member 13. Additional damping effect is of course secured by reason of counter-electromotive force induced in the main coil by its movement through the magnetic field, and which in effect reduces the main electromotive force to some extent, but since this counter-electromotive force is only induced by movement of the coils, it ceases when movement ceases, and therefore acts only to limit the deflection of the pointer, but not to move it from its position of rest.

The supporting means for and the connections to the coils are of course arranged in such a way that they will have no tendency to move the pointer out of a position of rest, but they will always offer a certain amount of resistance to movement of the movable element even though they be properly designed and thus make this resistance small. In order to make it possible completely to ignore the resistance offered by the supports, bearings and connections, the parts are preferably so designed that the retarding effect of the counter-torque is so much greater than such resistance that the latter will not affect the operation of the instrument with the limits of accuracy with which the instrument can be read; and any variation in the resistance of the bearings, supports or connections that might and probably would take place, for all practical purposes, would have no effect on the accuracy of the instrument.

In the arrangement shown, the connections to the coils of the instrument are through the mercury cups, 6, 7 and 8, one of the cups being employed as a common terminal for the two coils, thus reducing the number of connections. From the diagram of connections in Fig. 3 it will be seen that one terminal of the coil 9 is connected with the mercury cup 6, one terminal of the coil 10 is connected with the cup 7, while the other two terminals of the two coils are connected to the common cup, 8.

The mercury cups, 7 and 8, are connected to opposite terminals of the source of direct current, 14, preferably through a switch, 15, by means of which the current flow may be stopped and started. Where the instrument is employed for testing magnets after they have been magnetized, the switch 15 may conveniently take the form of a relay which is energized whenever current is caused to flow through coils, 16, by means of which the electro-magnet is magnetized. In the arrangement shown, the actuating coil of the relay is connected as a shunt across the coils 16 and the switch, 18, controls the flow of current both through the coils 16 and through the actuating coil of the relay. With this arrangement, whenever a magnet is placed upon the magnetizing device including the coils 16, as indicated in dotted lines at 17, and the switch 18 is closed to permit current to flow through the coils 16, the relay, 15, will close; thus sending current through the zero coil, 10, of the instrument and insuring that it will bring the pointer back to zero if it be not already there. When the switch, 18, is opened, the relay will open and the zero coil will become dead.

The magnet which has just been magnetized can be tested by passing it through an exploring coil, 19, so as to cut substantially all of the magnetic lines. This operation sets up a current in the exploring coil and, the latter having previously been connected to the mercury cup 8 and to the mercury cup 6, this current will flow through the main coil, 9, of the instrument and will produce a deflection of the needle depending on the strength of the magnet being tested. It will be seen that whenever the magnet is withdrawn from the exploring coil a reverse current is set up and this brings the pointer back approximately to zero. If the pointer is not exactly at zero, however, it will be brought there when the zero coil is again energized as heretofore explained.

Where it is desired to secure extreme accuracy, relative movement between the exploring coil and the magnet to be tested may be brought about in such a way that there will be no material variation throughout a series of successive tests. This may conveniently be accomplished by employing a swinging arm, 20, having at its free end a clamp or other suitable holding device, 21, in which the magnet to be tested may be held. With this arrangement, by allowing the exploring coil to remain stationary in a predetermined position, such that a magnet carried by the swinging arm will pass through the same when the arm is operated, and causing the arm to swing by gravity from a predetermined point or angle, in every instance, any desired number of magnets may be moved through the exploring coil in exactly the same manner; and therefore the time factor can have no effect whatever on the comparative readings of an entire series.

Instead of making the zero coil large enough completely to surround the cylindrical core, it may be made only half as wide as shown in Fig. 1 or, as indicated at 25 in Figs. 4 and 5 and be positioned so that it extends simply from the axis of the rotatable element out into the air gap where it lies normally in the weakest field midway between the corresponding tips of the two poles pieces. In this form of the movable element a core, 26, should be provided in one side with a longitudinal slot, 27, to permit the assembled coils to be placed in position thereon. If desired, the zero coil may be divided into two coils as indicated at 28 in Figs. 6 and 7; the effective portions of the two coils in the working field being so disposed that each lies in proximity to one edge of the slot or gap in the central core.

While I have illustrated and described in detail only a single preferred form of my invention with a few slight variations and have shown a single satisfactory means for revolubly supporting the rotatable element and for completing the electrical connections to the coils of the latter, I do not desire to be limited to the structural details thus illustrated and described; but intend to cover all forms and arrangements and all types of bearings and connections that fall within the terms of the definitions of my invention constituting the appended claims.

I claim:

1. In a measuring instrument of the kind described, for measuring a momentary flow of electricity, a magnetic field member, an indicating member including a coil pivotally mounted in the magnetic field to oscillate freely in the field when no current is flowing therein, and means for producing a restraining force on the indicating member which ceases as the indicating member comes to rest, and whereby the indicating member remains at its extreme indicating position.

2. In a measuring instrument of the kind described for measuring a momentary flow of electricity, a magnetic field member, an indicating member including a coil pivotally mounted in the magnetic field to oscillate freely when no current is flowing therein, means for producing a restraining force on the indicating member which ceases as the indicating member comes to rest, and whereby the indicating member remains at its extreme position until returned to zero indicating position, and an auxiliary coil on the indicating member adapted when energized to swing the indicating member back to zero indication.

3. In a measuring instrument of the kind described for measuring a momentary flow of electricity, a magnetic field member, an indicating member including a coil pivotally mounted in the magnetic field to oscillate freely when no current is flowing therein, and a closed metallic ring member within said coil and movable with the coil in the same magnetic field for producing a restraining force on the indicating member which ceases as the indicating member comes to rest, whereby the indicating member remains at its extreme indicating position.

4. In a measuring instrument of the kind described for measuring a momentary flow of electricity, a magnetic field member, an indicating member including a coil pivotally mounted in the magnetic field to oscillate freely when no current is flowing therein, damping means comprising a closed metallic ring member within and movable with said coil for producing a restraining force on the indicating member which ceases as the indicating member comes to rest, and whereby the indicating member remains at its extreme indicating position, and an auxiliary coil on the indicating member adapted when energized to swing the indicating member back to zero indication.

5. In a measuring instrument of the kind described, a magnetic field member, a main indicating coil member rotatable in the field of said member, an auxiliary coil movable with the main coil, indicating means including a pointer mechanically connected to said main coil, said coils and said field being movable relatively to each other, the parts being so arranged that when said pointer is at zero said auxiliary coil is substantially at right angles to the lines of force in said field, means for supplying current to the main coil to actuate the instrument, and means for supplying current to the auxiliary coil when the main coil is de-energized.

6. In a measuring instrument of the kind described, a magnetic field member, an indicating member arranged in the field of said member, said members adapted to swing freely relatively to each other when no current is flowing, indicating means associated with said indicating member, said indicating member including a main coil and an auxiliary coil, said auxiliary coil adapted to assume a predetermined position in the field of said magnetic member when no current is passing through same, the parts being so constructed and arranged that when the auxiliary coil is in such predetermined position the indicator registers zero, and means for supplying current to said auxiliary coil when it is desired to set the indicator at zero.

7. In a measuring device of the kind described, a magnetic field member, an indicating member arranged in the field of said member, said members being adapted to swing freely relatively to each other when no current is passed through the indicating member, an auxiliary coil forming part of said indicating member and adapted to place the indicating member in zero indicating position when current is passed through said auxiliary coil, and means for supplying current to said auxiliary coil when it is desired to return the indicating means to zero indicating position.

8. In a measuring instrument of the kind described, a magnetic field member, an indicating member comprising a main coil and an auxiliary coil rigidly connected together and placed at an angle to each other, indicating means associated with said coils, and constructed and arranged to indicate zero when said auxiliary coil is arranged substantially at right angles to the lines of magnetic force in the said field of said magnetic field member, said auxiliary coil being adapted to place itself in such position when current is passed therethrough, said main coil and said field member being adapted to swing relative to each other when current is passed through said main coil, means for supplying current to be measured to said main coil, and means for supplying current to the auxiliary coil when it is desired to return the indicating means to zero indication.

In testimony whereof, I sign this specification.

JOSEPH C. STANGIER.